(12) United States Patent
Daniel, Jr. et al.

(10) Patent No.: US 7,582,375 B2
(45) Date of Patent: Sep. 1, 2009

(54) METHOD FOR CUTTING SOLID OXIDE FUEL CELL ELEMENTS

(75) Inventors: Paul R. Daniel, Jr., Burton, MI (US);
Robert J. Svoboda, Fenton, MI (US);
Haskell Simpkins, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 768 days.

(21) Appl. No.: 11/199,533

(22) Filed: Aug. 8, 2005

(65) Prior Publication Data

US 2007/0028731 A1 Feb. 8, 2007

(51) Int. Cl.
*H01M 8/12* (2006.01)
*B26D 3/06* (2006.01)

(52) U.S. Cl. .............. 429/30; 429/49; 83/17; 83/875

(58) Field of Classification Search ............ 429/30, 429/33, 49; 83/17, 875; 408/701
See application file for complete search history.

(56) References Cited

U.S. PATENT DOCUMENTS 6,822,193 B2 * 11/2004 Olsen et al. ............ 83/29 X
2004/0144712 A1 * 7/2004 Stroh et al. ............ 210/321.89

* cited by examiner

*Primary Examiner*—Stephen J. Kalafut
(74) *Attorney, Agent, or Firm*—Paul L. Marshall

(57) ABSTRACT

A method for severing a solid-oxide fuel cell bi-layer element including a structural anode and an electrolyte layer, comprising the steps of orienting the bi-layer element such that the surface thereof is accessible to laser treatment; impinging a laser beam on the electrolyte surface; moving the impinged laser beam past the surface along a path in a plane corresponding to the desired severed edge to form a groove in the element extending partially through the element to a predetermined depth; and applying a bending moment across the groove to cause the element to break into first and second portions. The groove depth is preferably about 15% of the total thickness of the element.

12 Claims, 1 Drawing Sheet

METHOD FOR CUTTING SOLID OXIDE FUEL CELL ELEMENTS

This invention was made with United States Government support under Government Contract/Purchase Order No. DE-FC26-02NT41246 awarded by DOE. The Government has certain rights in this invention.

TECHNICAL FIELD

The present invention relates to fuel cells; more particularly, to methods for cutting fuel cell elements during assembly of a fuel cell stack; and most particularly, to a method for severing a solid oxide fuel cell bi-layer element which obviates the formation of stress cracks in the severed element.

BACKGROUND OF THE INVENTION

Fuel cells for combining hydrogen and oxygen to produce electricity are well known. One class of fuel cell includes a fuel cell element comprising a structural anode, a solid-oxide electrolyte layer, and a cathode layer deposited on the electrolyte layer opposite the anode. In the fuel cell reaction, oxygen anions migrate from the cathode through the electrolyte layer to the anode to combine with hydrogen atoms to produce electricity and water. Such fuel cells are referred to in the art as "solid-oxide" fuel cells (SOFCs).

In a currently-preferred manufacturing sequence for SOFCs, the solid-oxide electrolyte is coated to the anode to yield a so-called "green" bi-layer element, containing typically a dense yttria-stabilized zirconia electrolyte and a porous yttria-stabilized zirconia and nickel cermet anode. The green bi-layer element is fired to burn out various binders and to sinter the ceramic. It is important that the bi-layer element, oversized as formed, be sized to fit into the confines of a fuel cell stack, requiring a high level of dimensional control. It is desired to trim the fuel cell element to particular length and width dimensions at this stage wherein the element comprises only the structural anode and the solid-oxide electrolyte layer.

Various methods have been tried to obtain such dimensional control in both the green form and the post-fired form.

Sizing elements prior to firing has not proved to be successful because of firing shrinkage and variation in firing shrinkage. Fired elements presently have a dimensional standard deviation greater than +/−1% of their pre-fired dimensions.

Sizing elements subsequent to firing has also proved difficult due to the fragile nature of the elements. Any cutting methods contemplated must not induce mechanical stress, especially in a direction perpendicular to the element surface.

Conventional laser cutting of the element has been found to cause undesirable reduction of nickel oxide to nickel in the anode, introducing microcracking and a rough edge finish that leads to mechanical failure mechanisms in the finished fuel cell stack.

Water jet cutting typically includes an abrasive material such as garnet in a high velocity water stream focused at a point. Limitations of this method include garnet contamination of the element and again a rough edge finish as in laser cutting.

What is needed in the art is a means for severing an SOFC bi-layer element that provides a smooth edge, does not induce unacceptable mechanical stresses, and does not produce unacceptable amounts of nickel oxide.

It is a principal object of the present invention to sever a bi-layer SOFC element along a predetermined path, leaving a smooth edge free of microcracks.

SUMMARY OF THE INVENTION

Briefly described, a method for severing an SOFC bi-layer element having a structural anode and an electrolyte layer comprises the steps of:

a) orienting the bi-layer element such that the electrolyte layer is accessible;

b) impinging a laser beam on the surface of the electrolyte layer;

c) moving the impinged laser beam along a path corresponding to the desired severed edge to form a groove in the element extending partially through the element; and d) applying a bending moment to the element to cause the element to break along the formed groove.

The laser may be any of several well-known laser systems.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
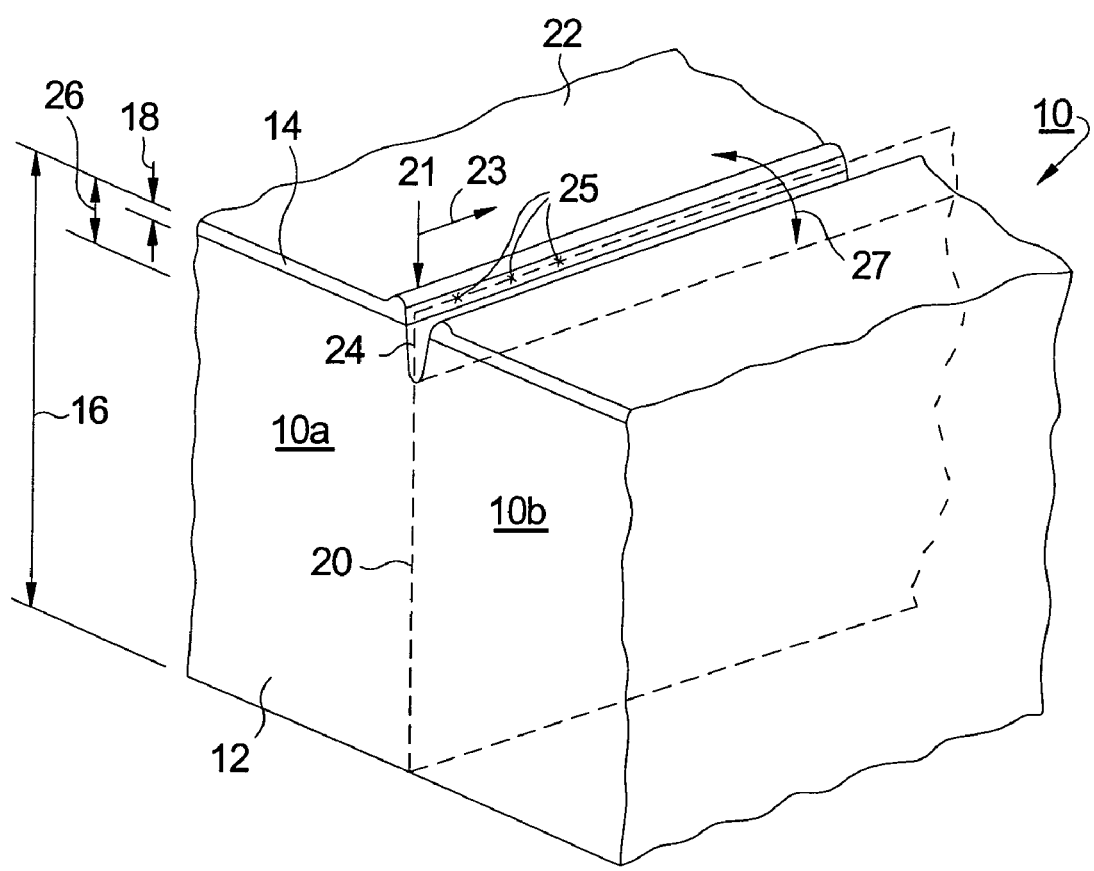
FIG. 1 is an isometric drawing of an SOFC bi-layer element having been laser-scribed in accordance with the invention, showing position and motion of a scribing laser.

Referring to FIG. 1, an SOFC bi-layer element 10 comprises a structural anode portion 12 and an electrolyte layer 14 coated to anode 12. Preferably, the overall thickness 16 of element 10 is about 460 µm, and the thickness 18 of electrolyte layer 14 is about 18 µm, or about 4% of overall thickness 16. Of course, these values, while currently preferred, are merely exemplary, and other values for thicknesses 16 and 18 are fully comprehended by the invention. Preferably, element 10 exists in a post-firing state, having been fired in known fashion after coating of an electrolyte layer composition to anode portion 12, although pre-fired b-layer elements are also comprehended by the invention.

A method in accordance with the invention for severing element 10 along plane 20 into a first portion 10a and a second portion 10b comprises the steps of:

a) orienting bi-layer element 10 such that the surface 22 of electrolyte layer 14 is accessible to laser treatment;

b) impinging a laser beam 21 on surface 22 at a point or series of points 25 contained in plane 20 (the laser being as described below);

c) moving the impinged laser beam past surface 22 along a path 23 contained in plane 20 and corresponding to the desired severed edge to form a groove 24 in element 10 extending partially through element 10 to a depth 26; and d) applying a bending moment 27 across groove 24 to cause element 10 to break along groove 24 and plane 20.

Depth 26 is preferably between about 2% and about 50% of total element thickness 16. In a currently preferred embodiment, depth 26 of groove 24 is about 66 µm, or about 15% of the total thickness 16 of element 10. However, it should be understood that the disclosed method of the invention, in contrast to the laser-cutting prior art, generically is a laser scribing method wherein groove 24 extends only part way through element 10 from the electrolyte side; therefore, all values and percentages of depth 26 short of element thickness 16 are comprehended by the invention.

Various laser apparatus may be employed in forming groove 24 in accordance with the invention, including but not limited to:

1. Q-switched 6-watt diode pumped Nd:YAG laser having a Q-switch pulse rate of 10,000 Hz, a bite size of 0.000183 in per pulse, and an average power of 5.5 W.

2. Q-switched 50-watt flashlamp pumped Nd:YAG laser having a Q-switch pulse rate of 10,000 Hz (bite size and average power not determined).

3. Q-switched 18-watt diode pumped Nd:YAG laser, frequency doubled (green: 532 nm) having a Q-switched pulse rate of 10,000 Hz.

Other laser types which are currently believed to be suitable include:

1. Q-switched green laser (532 nm).
2. Ultraviolet laser including Argon ion (100 nm to 400 nm).
3. Argon laser (488 nm and 514 nm).
4. $CO_2$ laser (10,600 nm).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for severing a solid-oxide bi-layer fuel cell element into a first portion and a second portion, comprising the steps of:
   a) orienting said bi-layer element such that a surface thereof is accessible to laser treatment;
   b) impinging a laser beam on said surface;
   c) moving said impinged laser beam past said surface along a path to form a groove in said element extending partially through said element to a predetermined depth; and
   d) applying a bending moment across said groove to cause said element to break along said groove, severing said solid-oxide bi-layer fuel cell element into said first portion and said second portion.

2. A method in accordance with claim 1 wherein said laser beam is impinged at a point contained in a plane extending through said element.

3. A method in accordance with claim 2 wherein said path is contained within said plane.

4. A method in accordance with claim 1 wherein said laser beam is formed by laser apparatus selected from the group consisting of: Q-switched 6-watt diode pumped Nd:YAG laser; Q-switched 50-watt flashlamp pumped Nd:YAG laser; Q-switched 18-watt diode pumped Nd:YAG laser, frequency doubled; Q-switched green laser (532 nm); Ultraviolet laser including argon ion (100 nm to 400 nm); argon laser (488 nm and 514 nm); and $CO_2$ laser (10,600 nm).

5. A method in accordance with claim 1 wherein the depth of said groove is between about 2% and about 50% of the total thickness of said element.

6. A method in accordance with claim 5 wherein said depth is about 15% of said total thickness.

7. A method for preparing a solid-oxide bi-layer fuel cell element to be severed into a first portion and a second portion, comprising the steps of:
   a) orienting said bi-layer element such that a surface thereof is accessible to laser treatment;
   b) impinging a laser beam on said surface; and
   c) moving said impinged laser beam past said surface along a path to form a groove in said element extending partially through said element to a predetermined depth, wherein said solid-oxide bi-layer fuel cell element may be severed into said first portion and said second portion by applying a bending moment across said groove to cause said element to break along said groove.

8. A method in accordance with claim 7 wherein said laser beam is impinged at a point contained in a plane extending through said element.

9. A method in accordance with claim 8 wherein said path is contained within said plane.

10. A method in accordance with claim 7 wherein said laser beam is formed by laser apparatus selected from the group consisting of: Q-switched 6-watt diode pumped Nd:YAG laser; Q-switched 50-watt flashlamp pumped Nd:YAG laser; Q-switched 18-watt diode pumped Nd:YAG laser, frequency doubled; Q-switched green laser (532 nm); Ultraviolet laser including argon ion (100 nm to 400 nm); argon laser (488 nm and 514 nm); and $CO_2$ laser (10,600 nm).

11. A method in accordance with claim 7 wherein the depth of said groove is between about 2% and about 50% of the total thickness of said element.

12. A method in accordance with claim 11 wherein said depth is about 15% of said total thickness.

\* \* \* \* \*